United States Patent
Lin et al.

(10) Patent No.: US 10,178,108 B1
(45) Date of Patent: Jan. 8, 2019

(54) SYSTEM, METHOD, AND COMPUTER PROGRAM FOR AUTOMATICALLY CLASSIFYING USER ACCOUNTS IN A COMPUTER NETWORK BASED ON ACCOUNT BEHAVIOR

(71) Applicant: Exabeam, Inc., San Mateo, CA (US)

(72) Inventors: Derek Lin, San Mateo, CA (US); Barry Steiman, San Ramon, CA (US); Domingo Mihovilovic, Menlo Park, CA (US); Sylvain Gil, San Francisco, CA (US)

(73) Assignee: Exabeam, Inc., San Mateo, CA (US)

( * ) Notice: Subject to any disclaimer, the term of this patent is extended or adjusted under 35 U.S.C. 154(b) by 276 days.

(21) Appl. No.: 15/169,284

(22) Filed: May 31, 2016

(51) Int. Cl.
*G06F 17/30* (2006.01)
*G06F 21/50* (2013.01)
*G06F 21/56* (2013.01)
*H04L 29/06* (2006.01)

(52) U.S. Cl.
CPC ...... *H04L 63/1408* (2013.01); *G06F 17/3053* (2013.01); *G06F 21/50* (2013.01); *G06F 21/566* (2013.01); *H04L 63/104* (2013.01); *H04L 63/1416* (2013.01); *H04L 63/1425* (2013.01); *H04L 63/1466* (2013.01)

(58) Field of Classification Search
CPC ........ G06F 21/50; G06F 21/55; G06F 21/552; G06F 21/554; H04L 63/1416; H04L 63/1425; H04L 63/1433; H04L 63/145; H04L 63/1466; H04L 43/16; H04L 67/22
See application file for complete search history.

(56) References Cited

U.S. PATENT DOCUMENTS

| | | | |
|---|---|---|---|
| 6,594,481 B1 * | 7/2003 | Johnson | H04L 63/1416 455/410 |
| 8,443,443 B2 | 5/2013 | Nordstrom et al. | |
| 8,539,088 B2 | 9/2013 | Zheng | |
| 8,606,913 B2 * | 12/2013 | Lin | G06F 21/554 709/224 |
| 8,676,273 B1 | 3/2014 | Fujisake | |
| 8,881,289 B2 * | 11/2014 | Basavapatna | G06F 21/552 726/25 |
| 9,055,093 B2 * | 6/2015 | Borders | G06F 21/552 |
| 9,081,958 B2 * | 7/2015 | Ramzan | G06F 21/55 |
| 9,189,623 B1 * | 11/2015 | Lin | G06F 21/56 |
| 9,680,938 B1 | 6/2017 | Gil et al. | |
| 9,898,604 B2 * | 2/2018 | Fang | G06F 21/56 |
| 2006/0090198 A1 | 4/2006 | Aaron | |
| 2008/0040802 A1 | 2/2008 | Pierson et al. | |

(Continued)

*Primary Examiner* — Tae K Kim
(74) *Attorney, Agent, or Firm* — Lessani Law Group, PC

(57) ABSTRACT

The present disclosure describes a system, method, and computer program for identifying and classifying service accounts in a network based on account behavior. For each evaluated account in the network, a plurality of behavior indicators are calculated. The behavior indicators correspond to service account behaviors and, for each account, are calculated based on network events associated with the account. Each behavior indicator is compared to a threshold specific to the corresponding behavior. If one or more behavior indicators for an account satisfies the applicable threshold, the account is deemed to display service account behavior. Consistency in which an account displays service account behavior is factored into classifying accounts as service accounts.

30 Claims, 12 Drawing Sheets

(56) References Cited

U.S. PATENT DOCUMENTS

| | | |
|---|---|---|
| 2008/0170690 A1 | 7/2008 | Tysowski |
| 2009/0144095 A1 | 6/2009 | Shahi et al. |
| 2009/0293121 A1 | 11/2009 | Bigus et al. |
| 2010/0125911 A1* | 5/2010 | Bhaskaran ............ G06Q 10/10 726/23 |
| 2010/0269175 A1 | 10/2010 | Stolfo et al. |
| 2013/0080631 A1* | 3/2013 | Lin ...................... G06F 21/554 709/224 |
| 2013/0117554 A1 | 5/2013 | Ylonen |
| 2013/0227643 A1 | 8/2013 | Mccoog et al. |
| 2013/0340028 A1 | 12/2013 | Rajagopal et al. |
| 2014/0315519 A1 | 10/2014 | Nielsen |
| 2015/0046969 A1 | 2/2015 | Abuelsaad et al. |
| 2015/0121503 A1 | 4/2015 | Xiong |
| 2015/0339477 A1 | 11/2015 | Abrams et al. |
| 2015/0341379 A1 | 11/2015 | Lefebvre et al. |
| 2016/0021117 A1 | 1/2016 | Harmon et al. |

* cited by examiner

SYSTEM, METHOD, AND COMPUTER PROGRAM FOR AUTOMATICALLY CLASSIFYING USER ACCOUNTS IN A COMPUTER NETWORK BASED ON ACCOUNT BEHAVIOR

BACKGROUND OF THE INVENTION

1. Field of the Invention

This disclosure relates generally to security analytics in computer networks, and, more specifically, to classifying user accounts as service accounts or non-service accounts based on account behavior.

2. Description of the Background Art

For user behavior modeling in IT network security analytics, it is critical to leverage contextual information to improve alert accuracy. For example, contextual information can be used to construct and evaluate context-specific rules. Whether an account is a service account or a non-service account (e.g., human user account) is useful contextual information in network security analytics. For example, if during a login session, an account is behaving as a service account, but it is known to be a non-service account, the login session may be a good candidate for an alert.

Currently, classifying an account as a non-service account or a service account is done manually and requires significant human effort. For example, an analyst may read an organization unit key from an identity management system and decide whether the key value pertains to a service account. This environment-specific effort is laborious and at best finds a subset of service accounts, leaving potentially other service accounts undiscovered. Furthermore, the process needs to be repeated as new accounts are added to the network. Therefore, there is a need for an automated method for identifying service accounts and classifying accounts as service accounts and non-service accounts.

SUMMARY OF THE DISCLOSURE

The present disclosure describes a system, method, and computer program for identifying and classifying service accounts in a network based on account behavior. Service accounts often exhibit one or more behaviors that are less likely to be demonstrated by a non-service account. For example, a service account may connect to many more hosts than a user account, or it may have more periodic activities than a user account.

A computer system tracks network events associated with network accounts. For each account, the system calculates a plurality of behavior indicators, each corresponding to a different service account behavior. The behavior indicators are calculated based on the network events associated with the account, and each behavior indicator represent the extent to which an account displays the corresponding service account behavior.

Each behavior indicator is compared to a threshold specific to the corresponding behavior. If one or more behavior indicators for an account satisfy the applicable threshold (exceeding or being below the threshold, whichever is applicable), the account is deemed to display service account behavior (i.e., it "triggers" for service account behavior).

Behavior-based decisioning is used to classify a network account as a service account or non-service account. In one embodiment, behavior indicators are calculated on a daily basis, but they may be calculated more or less frequently. An account may trigger for service account behavior one day, but not the next. Consequently, the consistency in which account displays or does not display service account behavior is considered in classifying the account.

In one embodiment, the computer system calculates a ratio of (1) the number of times the account triggered for service account behavior during a period of time to (2) the number of times during the period of time that the account was evaluated for service account behavior (the "service account attempt ratio"). The system also calculates a ratio of (1) the number of times the account did not trigger for service account behavior during the period of time to (2) the number of times during the period of time that the account was evaluated for service account behavior (the "non-service account attempt ratio")

In response to the service account attempt ratio exceeding a consistency threshold, the system classifies the account as a service account. In response to the non-service account attempt ratio exceeding the consistency threshold, the system classifies the account as a non-service account. In response to neither the service account attempt ratio and the non-service account attempt ratio exceeding the threshold, the system taking no action with respect to classifying the account.

In one embodiment, the following four behaviors are identified as service account behaviors: (1) generating many network events, (2) connecting to many hosts, (3) always online, and (4) having periodic activities. In this embodiment, a behavior indicator is calculated for each of these behaviors. A service account may display one or more of the four behaviors. Whether an account is deemed to have any of these service account behaviors is determined relative to the threshold for the service account behavior.

DETAILED DESCRIPTION OF THE PREFERRED EMBODIMENTS

Within an Information Technology (IT) network, service accounts often behave differently in one or more ways than non-service accounts because they have a different role in the network. For example, a service account may generate more network events than non-service accounts ("many events behavior"), connect to more hosts than non-service accounts ("many hosts behavior"), and/or have more periodic activities than non-service accounts ("periodic activity behavior"). Also, some service accounts are distinguishable in that they are online most of the time ("always online behavior"). A service account will not necessarily have all of these behaviors. Different service accounts may exhibit different subsets of these behaviors.

Figure 1A:
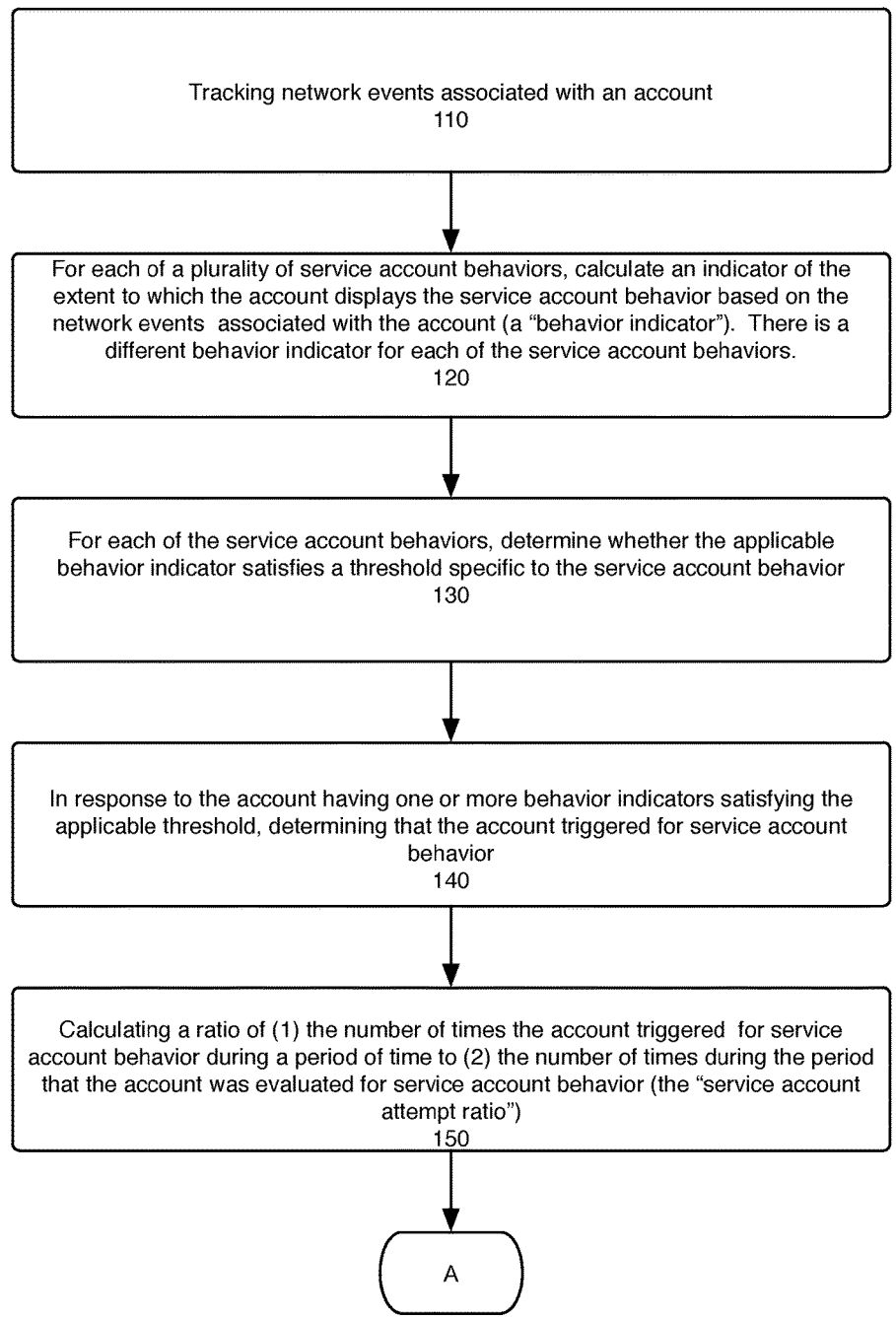
FIGS. 1A-1B are flowcharts that illustrate a method, according to one embodiment, for automatically classifying accounts as service accounts or non-service accounts based on account behavior.
Figure 1B:
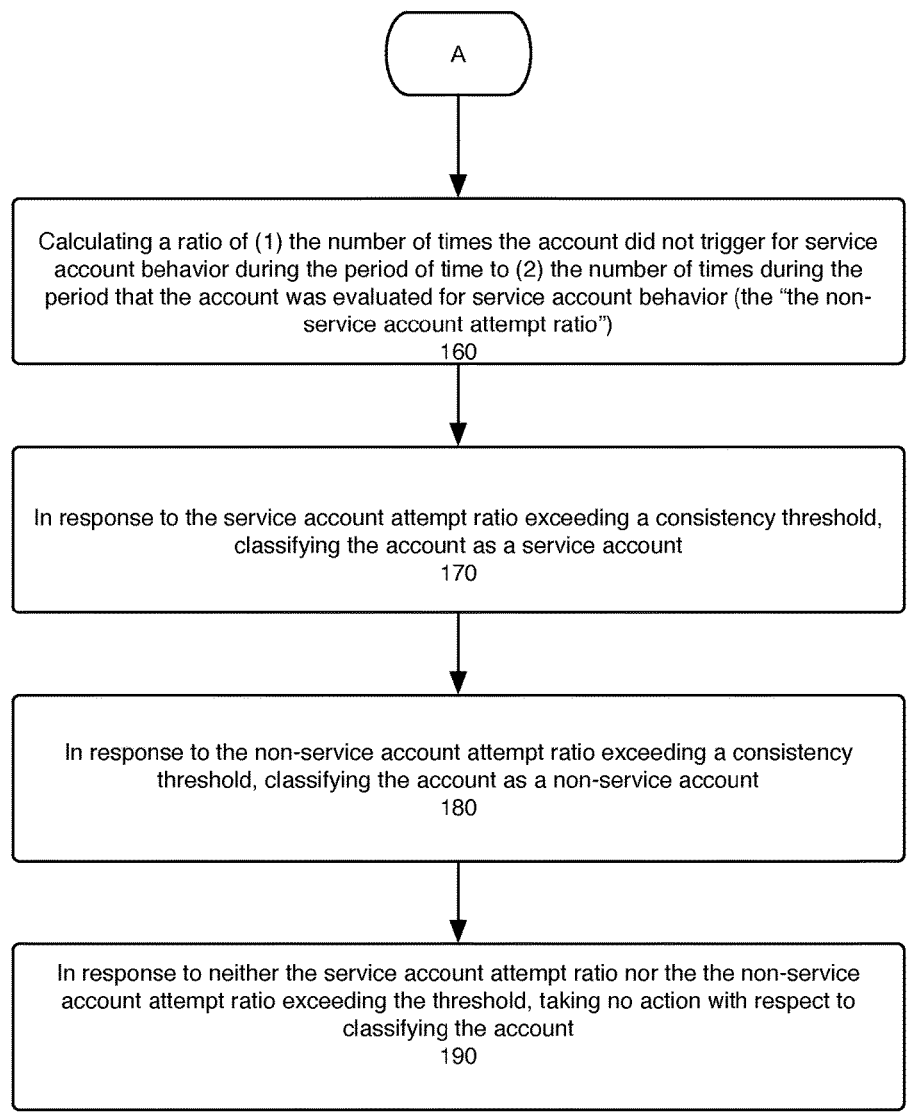

FIGS. 1A-B illustrate a method for classifying accounts as service accounts and non-service accounts based on whether an account displays a service account behavior. In the preferred embodiment, the behaviors used to distinguish service accounts from non-service accounts are the four behaviors listed above, but the method of FIGS. 1A-B is not limited to these behaviors.

The method is performed by a computer system (the "system") that tracks networks events for accounts in an entity's network (step 110). An entity may be an enterprise, a corporation, a government agency, or any other type of organization. In one embodiment, the system tracks network events by receiving and parsing event logs, as described in U.S. patent application Ser. No. 14/507,585, titled "System, Method and Computer Program Product for Detecting and Assessing Security Risks in a Network," and filed on Oct. 6, 2014 (the "'585 patent application"), the contents of which are incorporated by reference. The relevant data from the event logs is stored for each account.

The method of FIGS. 1A-1B is performed for each account in the network evaluated for classification. The part of the computer system that performs step 120-190 will be referred to herein as the "behavior-based classifier" or the "classifier."

For each account, the classifier determines the extent to which the account displays each of a plurality of service account behaviors. Specifically, the classifier calculates a plurality of service account behavior indicators for an account (step 120). Each behavior indicator corresponds to one of a plurality of service account behaviors and indicates the extent to which the account displays the corresponding service account behavior. The value of each behavior indicator is based on the network events associated with the account. Examples of how to calculate a behavior indicator for the four behaviors listed above are described with respect to FIGS. 2-5.

Each behavior indicator is associated with a threshold specific to that behavior indicator, wherein the threshold represents the dividing line between service account and non-service account behavior. As described further below, the threshold may be a fixed threshold or may be dynamically calculated each time an account is evaluated for service account behavior. This depends on the type of behavior. For example, in one embodiment, the threshold for "many events behaviors" is dynamically calculated each time accounts are evaluated for service account behavior because the number of events generated in the network can vary widely from day to day. Therefore, what is considered "many events" may vary on a daily basis. Conversely, what is considered "many connected hosts" depends on the number of hosts in the network, which does not vary widely on a day-to-day basis. Therefore, the threshold for such behavior may be fixed and recalculated only when the number of hosts in the network change.

For each of behavior indicators calculated in step 120 for an account, the classifier determines whether the behavior indicator satisfies the applicable threshold (step 130). "Satisfying" the threshold means that the behavior indicator is below or above the threshold, which ever is applicable for the service account behavior. In response to an account having any one of the behavior indicators satisfy the applicable threshold, the classifier determines that the account "triggered" for service account behavior (i.e., displayed at least one service account behavior) (step 140).

An account may display a service account behavior one day and not another day. Therefore, classifications are more reliable if consistency of behavior is factored into the classifications. To that end, the classifier calculates a ratio of (1) the number of times an account triggered for service account behavior during a period of time to (2) the number of times during the period that the account was evaluated for service account behavior (the "service account attempt ratio") (step 150). The classifier also calculates a ratio of (1) the number of times the account did not trigger for service account behavior during the period of time to (2) the number of times during the period that the account was evaluated for service account behavior (the "non-service account attempt ratio") (step 160). In one embodiment, an account is evaluated for the service account behavior once a day, and the period of time is a certain number of days. For example, if an account triggered for any one of the service account behaviors on 4 out of 7 days, the service account attempt ratio would be 4/7, and the non-service account attempt ratio would be 3/7.

The classifier determines whether the service account attempt ratio and the non-service account ratio for an account exceed a consistency threshold (e.g., 0.8). In response to the service account attempt ratio for an account exceeding the consistency threshold, the classifier classifies the account as a service account (step 170). In response to the non-service account attempt ratio exceeding the consistency threshold, the classifier classifies the account as a non-service account (step 180). If neither the service account attempt ratio, nor the non-service account attempt ratio exceed the consistency threshold, the classifier takes no action at this point with respect to classifying the account based on behavior (step 190). If the account has a current classification, the classification remains the same until at least the next time the account is evaluated under the methods of FIGS. 1A-1B.

FIGS. 2-5 illustrate example methods for performing steps 120-140 with respect to the many events behavior, many hosts behavior, periodic activity behavior, and always online behavior. FIGS. 6A-6B illustrates an example method for performing steps 140-190.

Many Events Behavior

Figure 2A:
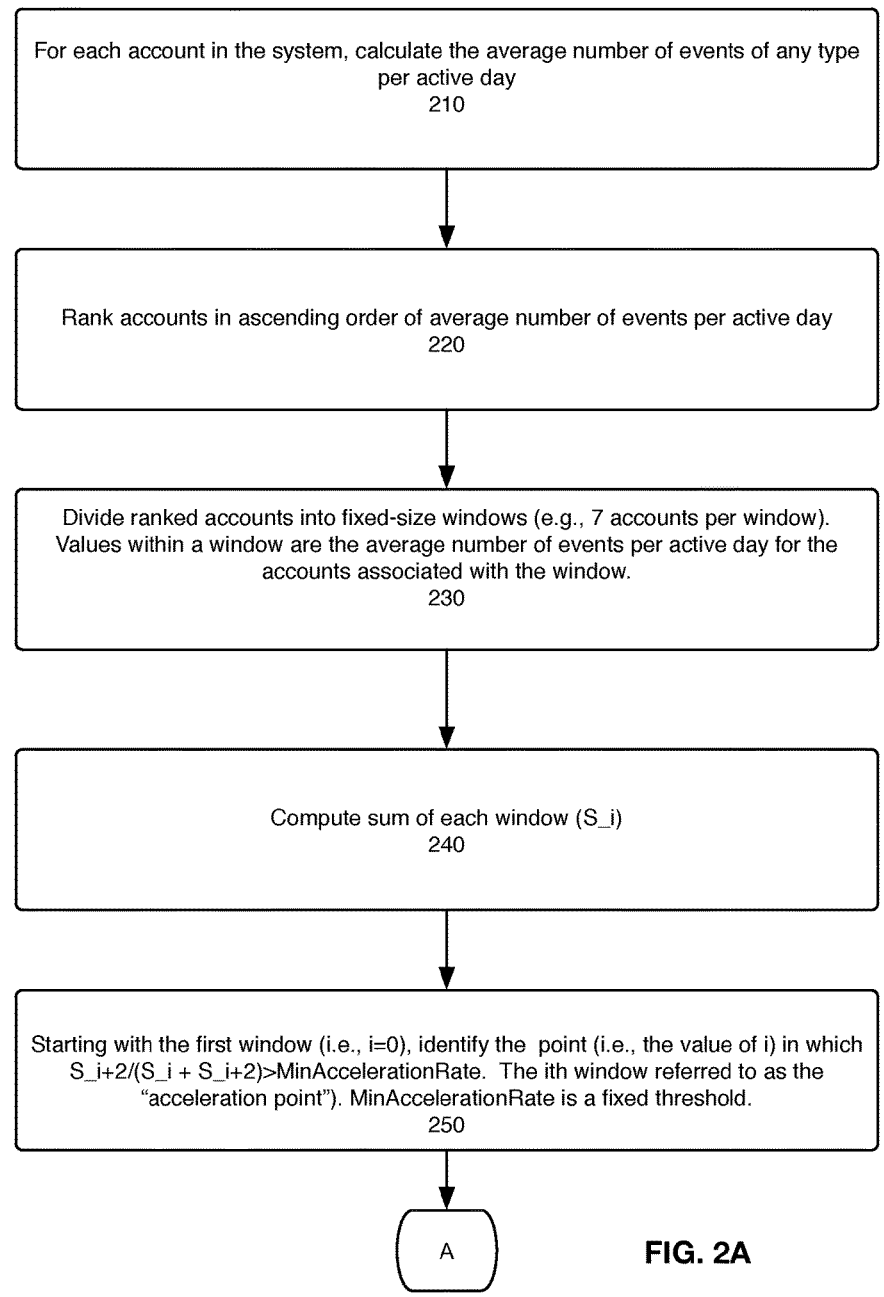
FIGS. 2A-B are flowcharts that illustrate a method, according to one embodiment, for identifying accounts that display "many events" behavior.
Figure 2B:
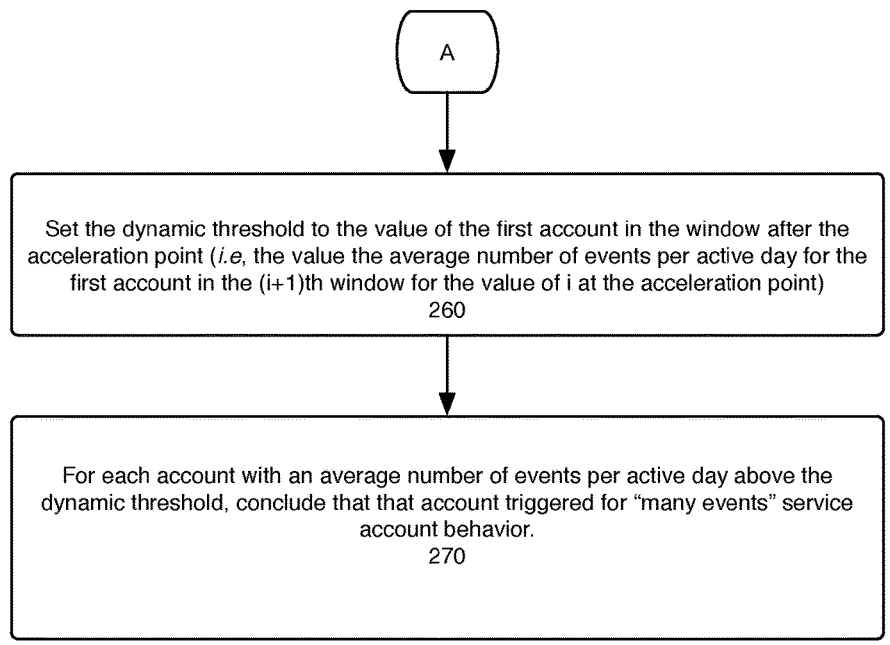

FIGS. 2A-B illustrate a method for identifying accounts that display the "many events" behavior. For each account in an entity's network, the classifier calculates the average number of events of any type per active day (step 210). For an account, an "active day" is a day on which at least one event is associated with the account. In this example, the average number of events of any type per active day is the behavior indicator for the many events behavior.

The period of time over which the average number of events per active day is calculated is configurable. In one embodiment, it is calculated over the number of days the account has been in existence (i.e., average number of events per active day=(# of events since the account has been in existence)/(# of active days since the account has been in existence)).

The classifier ranks all accounts in ascending order of the average number of events per active day (step 220), and it divides the ranked accounts into fixed-size, sequential windows (step 230). The windows are fixed-size in that they each have the same number of accounts. The values within the windows are the average number of events per active day for the accounts in the window. In one embodiment, the fixed-size of the window is seven accounts. In this embodiment, each window has seven values, namely seven values for the average number of events per active days. The first window would have the seven accounts with the lowest average number of events per active day, and the last window in the sequence would have the seven accounts with the highest average number of events per active day.

The classifier computes the sum of each window ($S_i$), where i is the sequence number of the window ($S_i$=sum of the values in window i) (step 240). Starting from the first window (i.e., i=0), the classifier identifies the window (i.e., the value of i) that satisfies $S_{i+2}/(S_i+S_{i+2})$>MinAcceleration-Rate (step 250). "MinAccerlationRate" is a fixed threshold. In one embodiment, it is set to 0.6 or 0.7. The identified window is referred to herein as the "acceleration point." If no window satisfies the above equation (i.e., the curve of all points is quite flat), then the window with the highest acceleration rate is the acceleration point.

The classifier sets the dynamic threshold for the "many events" behavior to the value of the first account in the window after the acceleration point (step 260). In other words, the dynamic threshold is set to the value of the average number of events per active day for the first account in the (i+1)th window for the value of i at the acceleration point.

For each account with an average number of events per active day above the dynamic threshold, the classifier concludes that the account triggered for (i.e., displayed) "many events" service account behavior (step 270).

Always Online Behavior

Figure 3A:
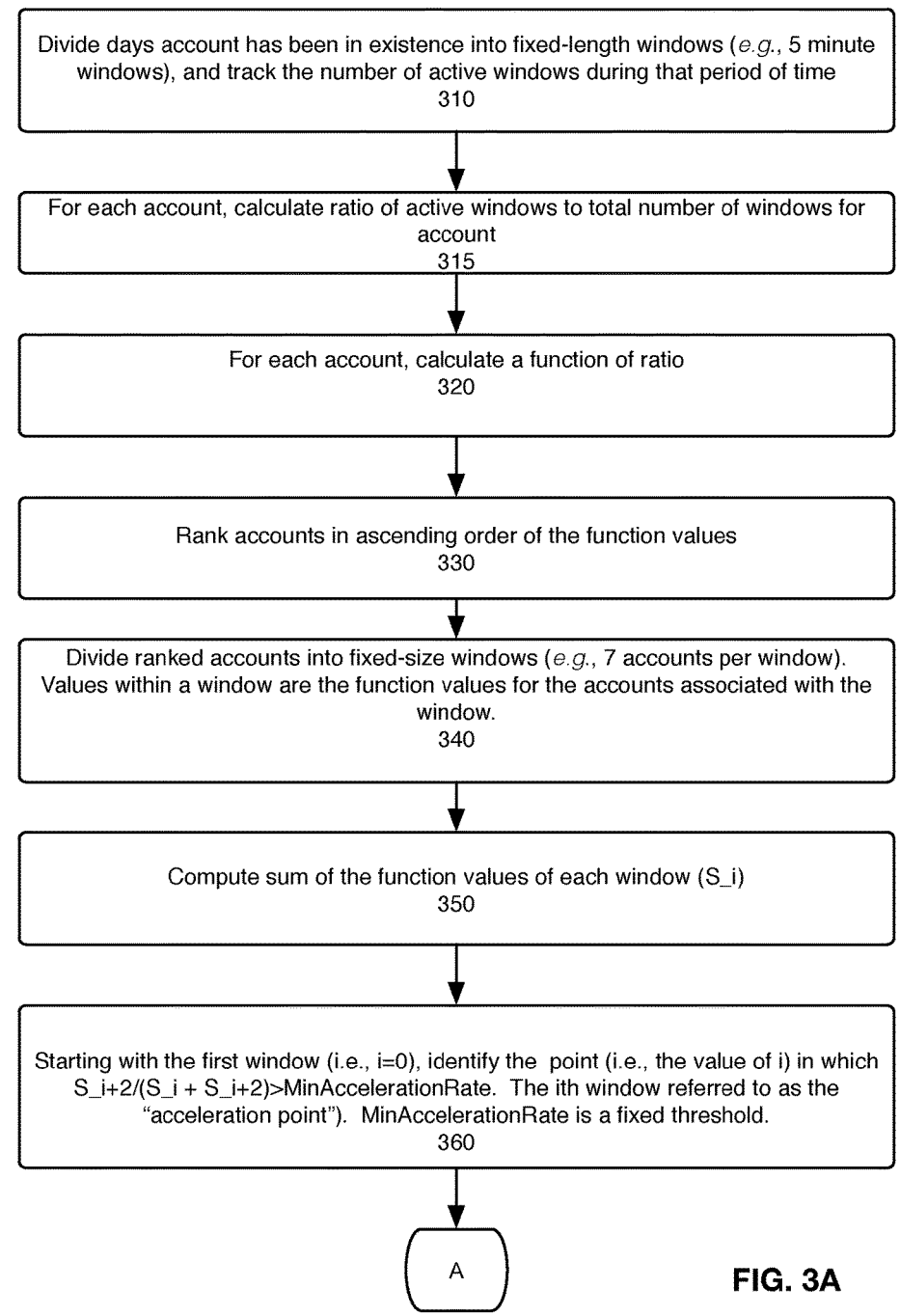
FIGS. 3A-B are flowcharts that illustrate a method, according to one embodiment, for identifying accounts that display "always online" behavior.
Figure 3B:
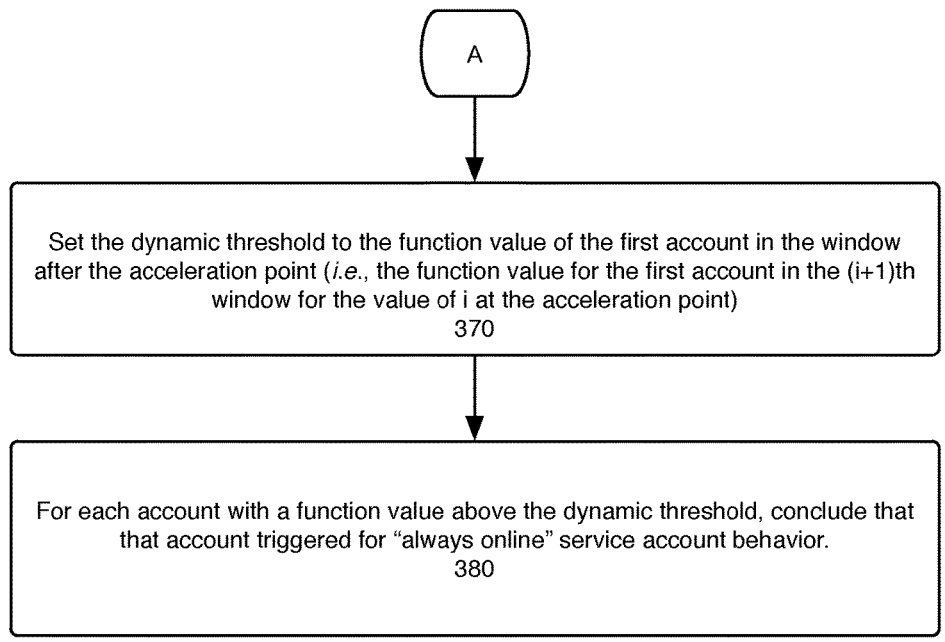

FIGS. 3A-3B illustrate a method for identifying accounts that display the "always online" behavior. For each account in the network, the classifier performs steps 310-320 to calculate the behavior indicator for the account. Specifically, the classifier divides the days an account has been in existence into 5 minute windows (e.g., 5 minute windows), and counts the active number of windows for the account since it has been in existence (step 310). An active window is a window in which the account had at least one event. The classifier calculates the ratio of active windows to total number of windows for the account (# of active-windows/total # of windows)) (step 315). For example, if days are divided into 5 minute windows, then there are 188 windows in a day, and, if an account has been in existence for 10 days, there are 1880 windows for the account. If the account was active for 900 of the 1880 windows, then the ratio is 900/1880=0.48, which means that 48% of the windows were active windows. The ratio in step 315 is calculated based on the number of windows and active windows since an account has been an existence, but the period of time over which the ratio is calculated is configurable. For example, the ratio could be calculated based on the last 60 days.

The classifier calculates a function of the ratio of step 315 (step 320). In one embodiment, the function is $1/(1-r)$, where r is the ratio calculated in step 315. The function value is the behavior indicator for the account. In other words, the behavior indicator is a function of the percentage of active windows for the account.

The classifier ranks accounts in ascending order of function values (step 330). If the function is $1/(1-r)$, then the classifier ranks accounts by the value of $1/(1-r)$.

The classifier divides the ranked accounts into fixed-size, sequential windows (step 340). The values within the windows are the function values for the ranked accounts in the window. The windows are fixed-size in that they each have the same number of accounts. In one embodiment, the fixed-size of the window is seven accounts. In this embodiment, the first window would have the seven accounts with the lowest function values, and the last window in the sequence would have the seven accounts with the highest function values.

The classifier computes the sum of each window ($S_i$), where i is the sequence number of the window ($S_i$=sum of the values in window i) (step 350). Starting from the first window (i.e., i=0), the classifier identifies the window (i.e., the value of i) that satisfies $S_{i+2}/(S_i+S_{i+2})$>MinAcceleration-Rate (step 360). "MinAccerlationRate" is a fixed threshold. In one embodiment, it is set to 0.6 or 0.7. The identified window is referred to herein as the "acceleration point." If no window satisfies the above equation (i.e., the curve of all points is quite flat), then the window with the highest acceleration rate is the acceleration point.

The classifier sets the dynamic threshold for the "always online" behavior to the value of the first account in the window after the acceleration point (step 370). In other words, the dynamic threshold is set to the function value (e.g., $1/(1-r)$) for the first account in the (i+1)th window for the value of i at the acceleration point.

For each account with a function value above the dynamic threshold, the classifier concludes that the account triggered for (i.e., displayed) "always online" service account behavior (step 380).

Many Connected Hosts Behavior

Figure 4:
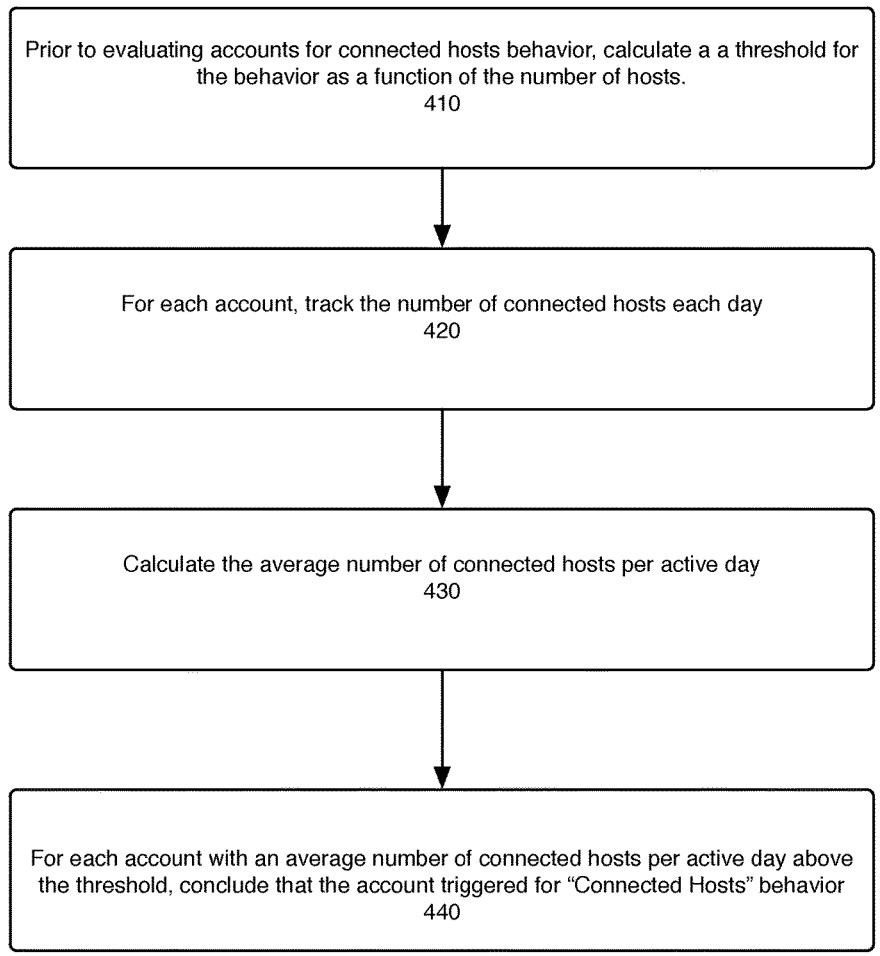
FIG. 4 is a flowchart that illustrates a method, according to one embodiment, for identifying accounts that display "many connected hosts" behavior.

FIG. 4 illustrates a method for identifying accounts that display the "many connected hosts" behavior. Prior to evaluating accounts for connected hosts behavior, the classifier calculates a threshold for the behavior as a function of the number of hosts in the network (step 410). The threshold stays the same until the number of hosts in the network changes. In one embodiment, the connected hosts threshold is calculated as follows:

Connected_Host_Threshold=min(upper_bound,(max (lower_bound),0.5%*nHosts))

In the above formula, "nHosts" is the total number of hosts in the network and "upper_bound" and "lower_bound" are predefined values. Example values for upper_bound and lower_bound are 100 and 30, respectively.

For each account in the network, the system tracks the number of connected hosts on each day (step 420), and the classifier calculates the average number of connected hosts per active day (step 430). Only days on which the account was active (i.e., had at least one connected host) are counted in calculating the average. The period of days over which the average is calculated is configurable. In one embodiment, the average is calculated based on the total number of active days since the account has been in existence. However, it could be the total number of active days within a defined period, such as 30 days. For each account with an average number of connected hosts per active day about the threshold, the classifier concludes that the account triggered for (i.e., displayed) "connected hosts" behavior (step 430).

Periodic Behavior

Figure 5:
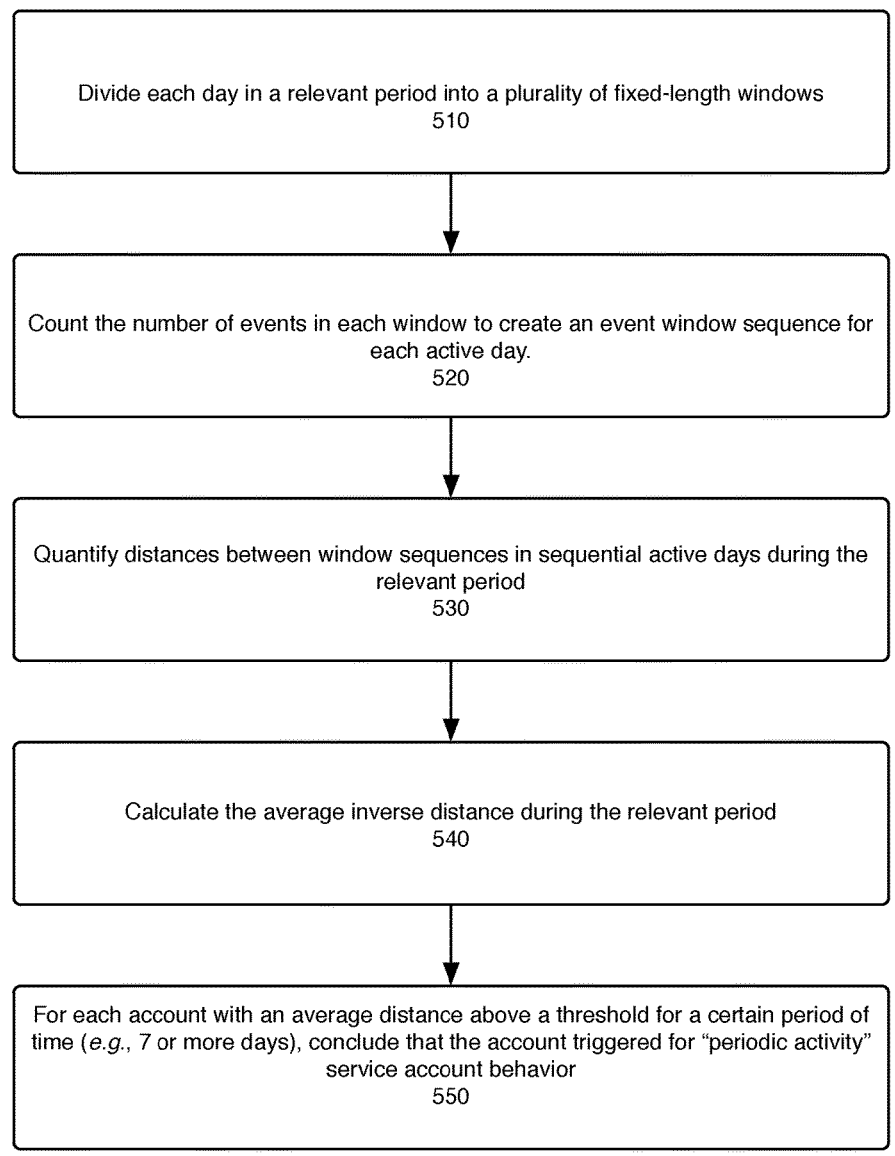
FIG. 5 is a flowchart that illustrates a method, according to one embodiment, for identifying accounts that display "periodic activity" behavior.
Figure 6A:
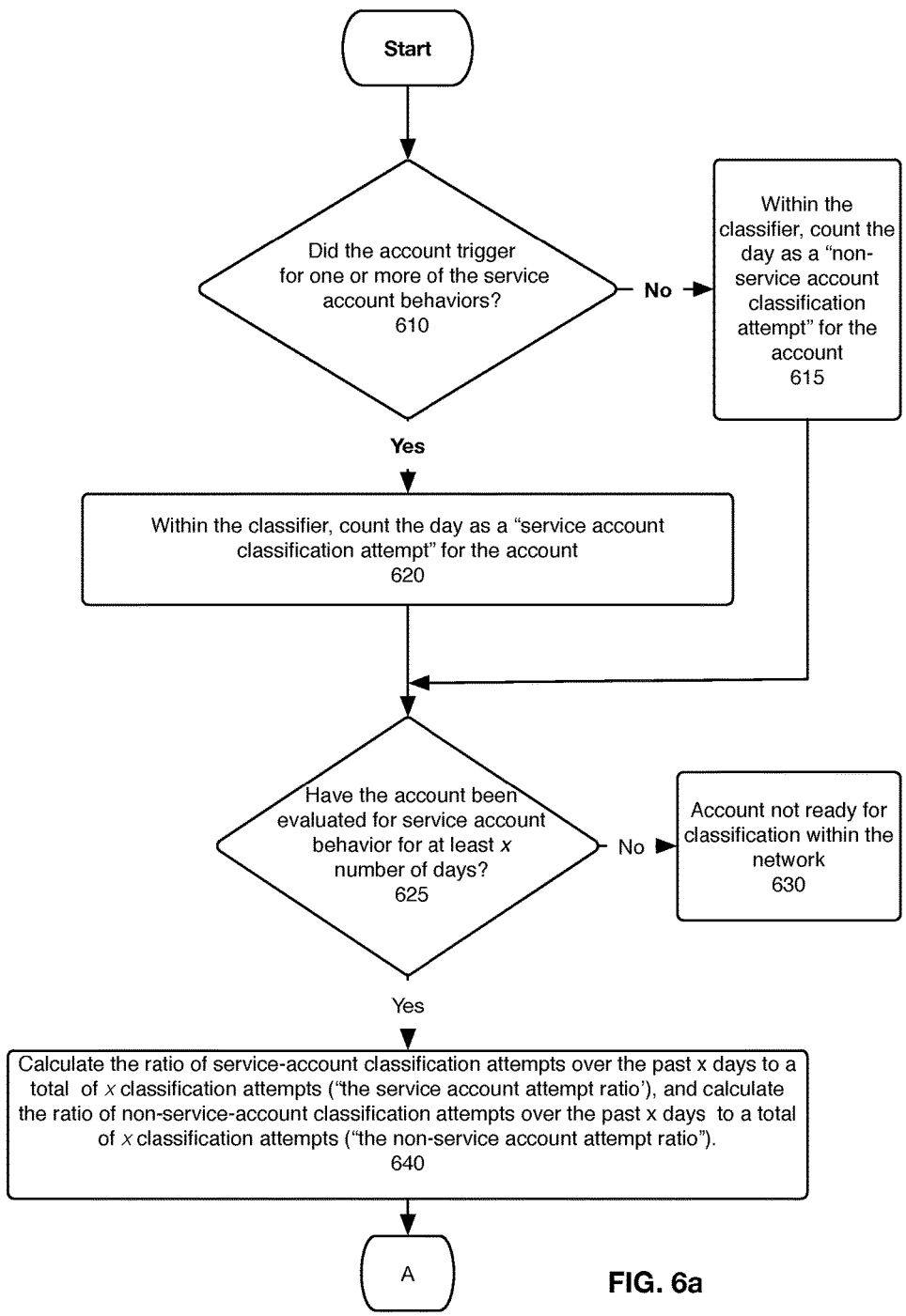
FIGS. 6A-6B are flowcharts that illustrate a method, according to one embodiment, for classifying user accounts based on the consistency in which accounts do or do not display service account behavior.
Figure 6B:
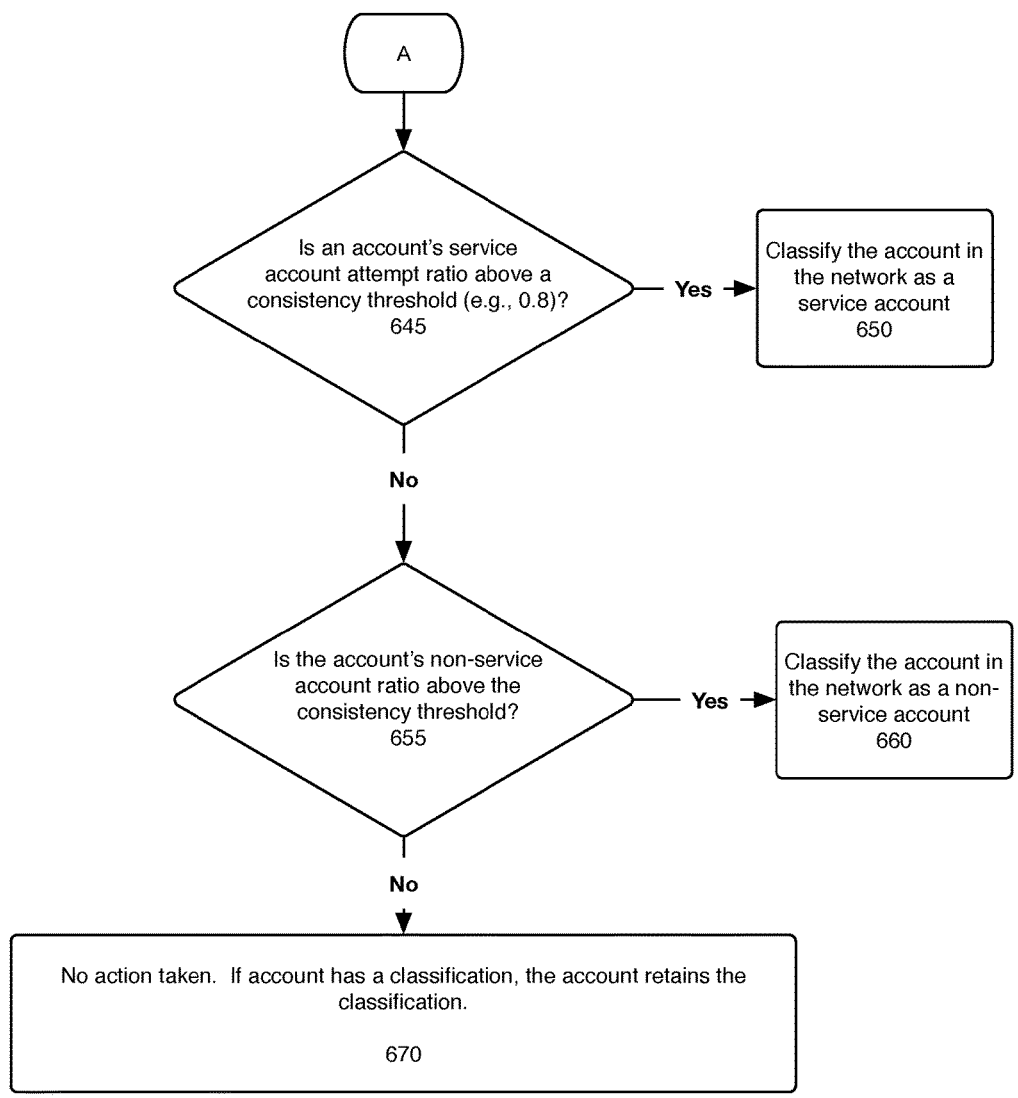

FIG. 5 illustrates a method for identifying accounts that display the "periodic" behavior. Days are divided into a plurality of fixed-length windows (step 510). For example, a day may be divided into 144 ten minute windows. For each account, the classifier counts the number of events in each window to create an event window sequence for each active day in a certain period of time (e.g., since the account has been in existence, the last 60 days, etc.) (step 520). For example, assume a day is divided into four fixed-sized window. If an account has 20 events in the first window, 15 events in the second window, 45 windows in the third window, and 32 events in the fourth window, then the event sequence for the account for the day is [20, 15, 45, 32]. Non-active days are disregarded in this calculation.

For each account, the classifier quantifies the distance between window sequences in sequential active days (step 530). In one embodiment, the distance is the Euclidean distance (see example below). If an account has periodic behavior, then its windows on different days should be similar and the distance between windows sequences on sequential active days should be relatively small compared to the distance between window sequences of an account without (or with less) periodic behavior.

After calculating the distance between window sequences in sequential active days, the classifier then calculates the average inverse distance over the relevant period of time (e.g., since the account has been in existence) (step 540). The average inverse distance is the behavior indicator for the periodic behavior.

For each account with an average inverse distance above a threshold for a certain period of time (e.g., 7 days), the classifier concludes that the account triggered for periodic service account behavior (step 550). An example threshold is 30.0.

The below is an example of one way in which to calculate the distance between window sequences in two sequential active days.

In this example, assume for simplicity that there are four windows per clay. On day x, the event sequence for an Account A is [20, 3, 6, 14]. On day y, the event sequence for the Account A is [3, 35, 17, 0]. Normalized Euclidean Distance is used to quantify the distance between two window sequences of two days. Specifically, the distance between a window sequence on day x and window sequence on day y is as below:

$$\text{Distance}(W_x, W_y) = \text{Sqrt}(\text{Sum}_i((w_{x,i} - w_{y,i})^2)),$$

where:
$W_x$ is the window sequence on day x;
$W_y$ is the window sequence on day y;
i is the iterator of window indices of a day; and $$w_{x,i} = W_{x,i}/\text{Sum}_k(W_{x,k}),$$

and $w_{y,i} = W_{y,i}/\text{Sum}_k(W_{y,k}),$

The use of $w_{x,i}=W_{x,i}/\text{Sum}_k(W_{x,k})$, and $w_{y,i}=W_{y,i}/\text{Sum}_k(W_{y,k})$, is to normalize the original data's value by dividing each value in the window by the sum of all values for that window.

Using the above example, where $W_x=[20, 3, 6, 14]$, and $W_y=[3, 35, 17, 0]$, after normalization we have:
Sum$_k(W_{x,k})$=43
Sum$_k(W_{y,k})$=55
$w_x$=[20/43, 3/43, 6/43, 14/43]
$w_y$=[3/55,35/55,17/55,0/55]
Distance($W_x$ and $W_y$)=sqrt((20/43−3/55)$^2$+(3/43−35/55)$^2$+(6/43−17/55)$^2$+(14/43−0/55)$^2$)=0.7901596
The inverse distance is 1.265567.

Now, assume Account B has the following window sequences on days x and y: [20, 20, 100, 20], [20, 20, 101, 20]. The distance between these window sequences are calculated as follows:

Sum$_k(W_{x,k})$=160
Sum$_k(W_{y,k})$=161
$w_x$=[20/160, 20/160, 100/160, 20/160]
$w_y$=[20/161, 20/161,101/161, 20/161]
Distance($W_x$ and $W_y$)=sqrt((20/160−20/161)$^2$+(20/16/10−2061)+(100/160−101/161)+(20/160−20/161)$^2$)=0.00268952
The inverse distance is 371.813557

Over days x and y. Account B has significantly more periodic behavior than Account A as the distance between window sequences on these two days is smaller for Account B.

Classifying Accounts

As stated above, an account may display a service account behavior one day and not another day. Therefore, classifications are more reliable if consistency of behavior is factored into the classifications. FIGS. 6a-6b illustrate a method for classifying user accounts that takes into account the consistency in which accounts display or do not display service account behavior. In the embodiment described with respect to FIGS. 6a-6b, accounts are evaluated for service account behaviors and for classification once a day. However, accounts may be evaluated more or less frequently.

Before the method of FIGS. 6a-6b are performed on a day, the accounts are first evaluated for service account behavior on that day, such as described with respect to FIGS. 2-5.

For each account evaluated, the classifier determines whether the account triggered for at least one of the service account behaviors in the current day (step 610). If the account did not trigger for any of the service account behaviors in the current day, the classifier counts the the current day as a "non-service account classification attempt" for the account (step 615). If the account triggered for at least one of the service account behaviors, the classifier counts the day as a "service account classification attempt" for the account (step 620).

The classifier determines if an account has been evaluated for service account behavior at least x number of days (step 625). In one embodiment, an account must have been evaluated for service account behavior at least eight times (i.e., eight days) before the classifier will classify the account, and account must have at least 7 days history before it is first evaluated for service account behavior. In such embodiment, the account must have been in existence 15 days (7+8=15) before it can be classified. If step 625 evaluates to false, then the account is not ready for classification within the network (step 630). If step 625 evaluates to true, the classifier calculates the following ratios (step 640):

Service account attempt ratio=service-account classification attempts over the past $x$ days/$x$ Non service account attempt ratio=non-service account attempt ratio over the past $x$ days/$x$ In response to the service account attempt ratio being above a consistency threshold (e.g., 0.8), the classifier classifies the account as being a service account (steps 645, 650). This may be a new classification for the account or a repeat classification.

In response to the non-service account attempt ratio being above a consistency threshold (e.g., 0.8), the classifier classifies the account as being a non-service account (steps 655, 660). This may be a new classification for the account or a repeat classification. If neither ratio is above the consistency threshold, the classifier takes no action with respect to classifying the account (step 670). If the account has a classification, the account retains the classification. The method of FIG. 6A-6B is performed for all the accounts in the networks (or all the accounts that need to be classified).

Using a Behavior-Based Classifier in Conjunction with a Keys-Based Classifier

The output of the behavior-based classifier described above can be combined with a classifier based on identity managed keys (the "keys-based classifier"), such as the keys-based classifier described in U.S. patent application Ser. No. 15/058,034, titled "System, Method, and Computer Program for Automatically Classifying User Accounts in a Computer Network using Keys from an Identity Management System," and filed on Mar. 1, 2016, the contents of which where incorporated by reference. Specifically, the outputs of the two classifiers can be combined to identify the potential misuse of a non-service account (e.g., a human user account). For example, the two classifiers can be used to identify account that are likely non-service user accounts behaving as service accounts. Using a human user account to run service account activities is typically a corporate IT policy violation and a sign of a network security breach.

Figure 7A:
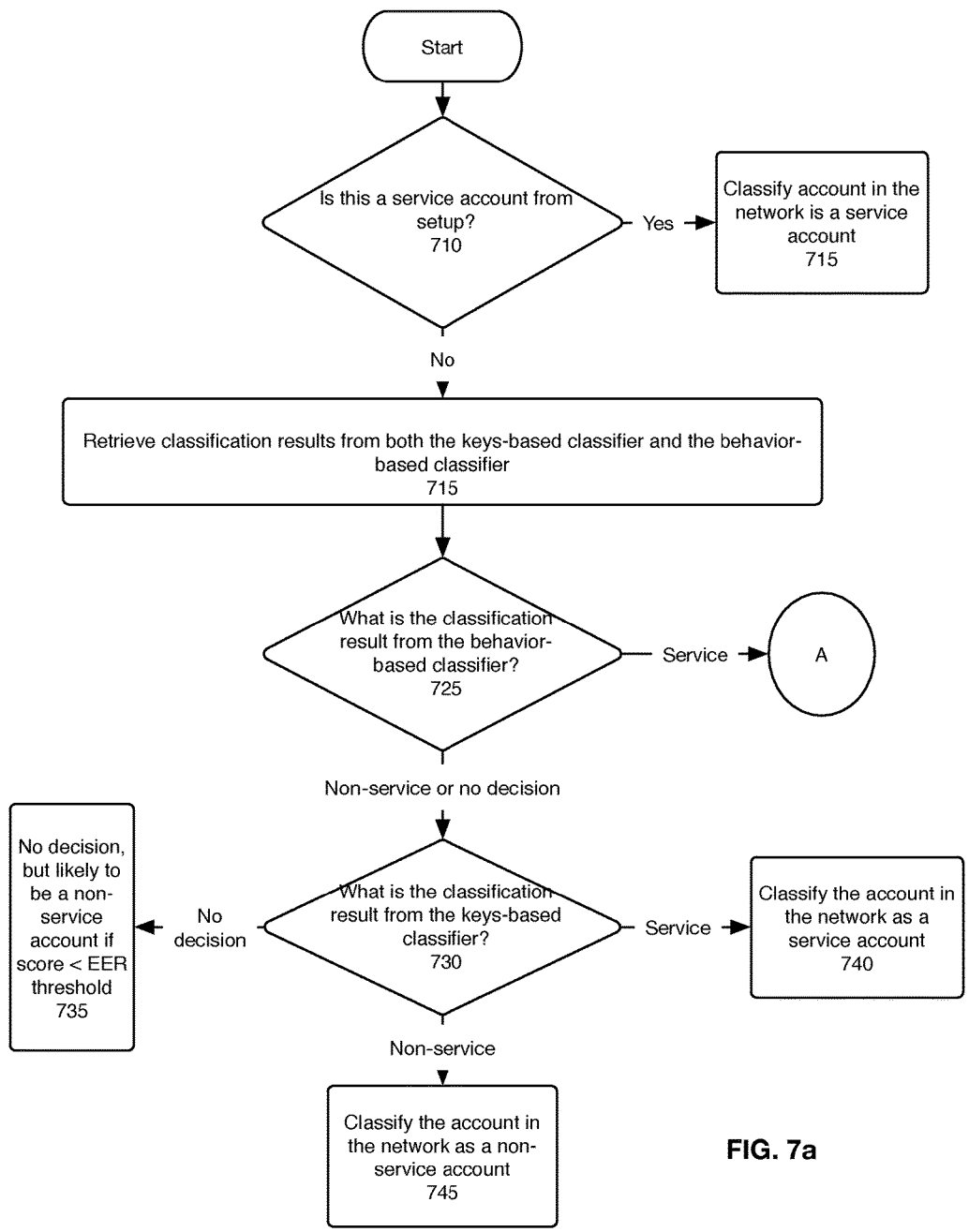
FIGS. 7A-7B are flowcharts that illustrate a method, according to one embodiment, for using both a behavior-based classifier and a keys-based classifier to identify non-service accounts behaving as service accounts.
Figure 7B:
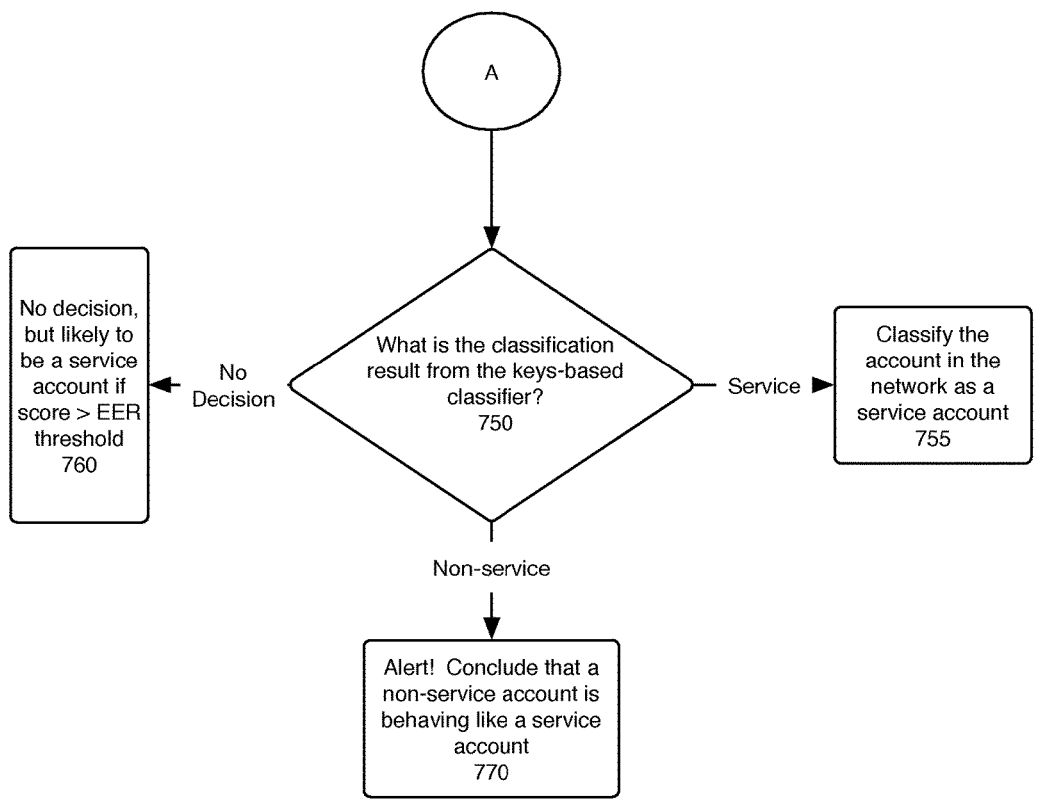

FIGS. 7a-7b illustrate a method, according to one embodiment, for using both a behavior-based classifier (such as a classifier operating as described in FIGS. 1-6) and a keys-based classifier to identify likely non-service accounts behaving as service accounts. The method is performed by a computer system that monitors a computer network for potential misuse or security threats (a "network monitoring system"), such as the system described in the '585 patent application referenced above. For each account evaluated, the network monitoring system determines if the account is labeled as a service account from the setup (step 710). If so, the network monitoring system classifies the account in the network as a service account (step 715). If not, the network monitoring system retrieves the classification results for the account from both the behavior-based classifier and the keys based classifier (step 720). The network monitoring system combines the results of the two classifiers to come to the applicable conclusion shown in flowcharts 7A-7B and listed in Table 1 below:

TABLE 1

| Result of Behavior-based Classifier | Results of Keys-Based Classifier | Conclusion based on combined results | Path in Flowchart |
| --- | --- | --- | --- |
| Non-service account or no classification | Service Account | Service Account | 725 to 730 to 740 |
| Non-service account or no classification | Non-service Account | Non-service Account | 725 to 730 to 745 |
| Non-service account or no classification | No decision | No decision, but likely to be a non-service account if key-based score is less than the EER threshold used by the key-based classifier | 725 to 730 to 735 |
| Service Account | Service Account | Service Account | 725 to 750 to 755 |

TABLE 1-continued

| Result of Behavior-based Classifier | Results of Keys-Based Classifier | Conclusion based on combined results | Path in Flowchart |
| --- | --- | --- | --- |
| Service Account | No decision | No decision, but likely to be a service account if key-based classification score is greater than the EER threshold used by the key-based classifier | 725 to 750 to 760 |
| Service Account | Non-service account | Issue security alert. A non-service account is behaving like a service account. | 725 to 750 to 770 |

Miscellaneous

The methods described with respect to FIGS. 1-7B are embodied in software and performed by a computer system (comprising one or more computing devices) executing the software. A person skilled in the art would understand that a computer system has one or more memory units, disks, or other physical, computer-readable storage media for storing software instructions, as well as one or more processors for executing the software instructions.

As will be understood by those familiar with the art, the invention may be embodied in other specific forms without departing from the spirit or essential characteristics thereof. Accordingly, the above disclosure is intended to be illustrative, but not limiting, of the scope of the invention, which is set forth in the following claims.

The invention claimed is:

1. A method, performed by a computer system, for identifying and classifying service accounts in a network based on account behavior, the method comprising:
    classifying an account during setup as a service account or a non-service account;
    tracking networks events associated with the account;
    for each of a plurality of service account behaviors, calculating an indicator of the extent to which the account displays the service account behavior (a "behavior indicator"), wherein there is a different behavior indicator for each of the service account behaviors, wherein each behavior indicator is calculated based on the network events associated with the account, and wherein one service account behavior is generating many network events ("many events behavior");
    for each of the service account behaviors, determining whether the applicable behavior indicator satisfies a threshold specific to the service account behavior, wherein the threshold for the many events behavior is dynamically determined each time the behavior of the accounts in the network is classified, and wherein the threshold is determined by ranking accounts by the average number of events per active day and then identifying an acceleration point in the average number of events per active day;
    in response to the account having one or more behavior indicators satisfy the applicable threshold, determining that the account triggered for service account behavior, wherein determining whether an account triggers for many events behavior further comprises:

for each account in the system, calculating the average number of events of any type per active day, ranking accounts in ascending order of average number of events per active day, dividing ranked accounts into fixed-size windows each having a sequence number, computing the sum of each window ($S_i$), wherein i is the sequence number, starting with the first fixed-size window, identifying the first value for i in which $S_{i+2}/(S_i+S_{i+2})$ is greater than a minimum acceleration rate, wherein the minimum acceleration rate is a threshold with a predetermined value, setting the dynamic threshold for the many events account behavior to the average number of events per active day in the first account in the (i+1)th window for the above-identified value of i, and for each account with an average number of events per active day above the dynamic threshold, concluding that the account triggered for the many events behavior;

calculating a ratio of (1) the number of times the account triggered for service account behavior during a period of time to (2) the number of times during the period of time that the account was evaluated for service account behavior (the "service account attempt ratio");

calculating a ratio of (1) the number of times the account did not trigger for service account behavior during the period of time to (2) the number of times during the period of time that the account was evaluated for service account behavior (the "non-service account attempt ratio");

in response to the service account attempt ratio exceeding a consistency threshold, classifying the account behavior as that of a service account;

in response to the non-service account attempt ratio exceeding the consistency threshold, classifying the account behavior as that of a non-service account;

in response to neither the service account attempt ratio and the non-service account attempt ratio exceeding the threshold, taking no action with respect to classifying the account behavior; and in response to the account during setup being classified as a non-service account but the account behavior being classified as that of a service account, issuing a security alert that a non-service account is behaving like a service account.

2. The method of claim 1, wherein the service account behaviors further include: connecting to many hosts ("many hosts behavior") and having periodic activities ("periodic activity behavior"), and wherein whether an account is deemed to have any of these service account behaviors is determined relative to the threshold for the service account behavior.

3. The method of claim 2, wherein threshold for the many hosts behavior is calculated relative to a total number of hosts in the network.

4. The method of claim 2, wherein the threshold for the periodic behavior is a fixed value.

5. The method of claim 2, wherein determining whether an account triggers for the connected hosts behavior comprises:

calculating an average number of connected hosts per active day for the account;

determining whether the average number of connected hosts per active day exceeds a fixed threshold based on the number of hosts in the network; and in response to determining that the average number of connected hosts per active day exceeds the fixed threshold, concluding that the account triggers for the connected host behavior.

6. The method of claim 2, wherein determining whether an account triggers for the periodic behavior comprises:

dividing each day in a period of time into a plurality of fixed-length windows;

counting the number of events for the account in each fixed-length window to create an event-window sequence for each day during the period of time;

quantifying distances between the window sequences in sequential active days during the relevant period;

calculating an average inverse distance during the relevant period;

determining whether the average inverse distance exceeds a fixed threshold;

in response to determining that the average inverse distance exceeds a fixed threshold, concluding that the account triggered for the always online behavior.

7. The method of claim 2, wherein the service account behaviors also include being online all the time ("always online behavior").

8. The method of claim 7, wherein the threshold for the always online behavior is dynamically determined each time the behavior of the accounts in the network is classified, and wherein the threshold is determined by ranking accounts by a function of an average number of active fixed-length windows and identifying an acceleration point in the function values.

9. The method of claim 8, wherein determining whether an account triggers for always online behavior further comprises:

dividing days in a period of time into fixed-length windows;

for each account, tracking the number of active windows in the period of time;

for each account, calculating an average number of active fixed-length windows;

for each account, calculating a function of the average number of active fixed-length windows, wherein the function is the behavior indicator for always online behavior;

ranking accounts in ascending order of function values;

dividing ranked accounts into fixed-size windows each having a sequence number;

computing the sum of the function values of each window ($S_i$), wherein i is the sequence number;

starting with the first fixed-size window, identifying the first value for i in which $S_{i+2}/(S_i+S_{i+2})$ is greater than a minimum acceleration rate, wherein the minimum accelerate rate is a threshold with a predetermined value;

setting the dynamic threshold for the always online behavior to the function value of the first account in the (i+1)th window for the above-identified value of i;

for each account with a function value about the dynamic threshold, concluding that the account triggered for the always online behavior.

10. The method of claim 1, wherein:

accounts in the network are evaluated for service account behavior on a daily basis;

calculating the service account attempt ratio comprises calculating the number of days, over a period of x days, that an account triggered for service account behavior and dividing the number by x; and calculating the non-service account attempt ratio comprises calculating the number of days, over a period of x days, that an account did not trigger for service account behavior and dividing the number by x, wherein x is a number greater than 1.

11. A non-transitory computer-readable medium comprising a computer program that, when executed by a computer system, enables the computer system to perform the following method for identifying and classifying service accounts in a network based on account behavior, the method comprising:

classifying an account during setup as a service account or a non-service account;

tracking networks events associated with the account;

for each of a plurality of service account behaviors, calculating an indicator of the extent to which the account displays the service account behavior (a "behavior indicator"), wherein there is a different behavior indicator for each of the service account behaviors, wherein each behavior indicator is calculated based on the network events associated with the account, and wherein one service account behavior is generating many network events ("many events behavior");

for each of the service account behaviors, determining whether the applicable behavior indicator satisfies a threshold specific to the service account behavior, wherein the threshold for the many events behavior is dynamically determined each time the behavior of the accounts in the network is classified, and wherein the threshold is determined by ranking accounts by the average number of events per active day and then identifying an acceleration point in the average number of events per active day;

in response to the account having one or more behavior indicators satisfying the applicable threshold, determining that the account triggered for service account behavior, wherein determining whether an account triggers for many events behavior further comprises:

for each account in the system, calculating the average number of events of any type per active day, ranking accounts in ascending order of average number of events per active day, dividing ranked accounts into fixed-size windows each having a sequence number, computing the sum of each window ($S_i$), wherein i is the sequence number, starting with the first fixed-size window, identifying the first value for i in which $S_{i+2}/(S_i+S_{i+2})$ is greater than a minimum acceleration rate, wherein the minimum acceleration rate is a threshold with a predetermined value, setting the dynamic threshold for the many events account behavior to the average number of events per active day in the first account in the (i+1)th window for the above-identified value of i, and for each account with an average number of events per active day above the dynamic threshold, concluding that the account triggered for the many events behavior;

calculating a ratio of (1) the number of times the account triggered for service account behavior during a period of time to (2) the number of times during the period of time that the account was evaluated for service account behavior (the "service account attempt ratio");

calculating a ratio of (1) the number of times the account did not trigger for service account behavior during the period of time to (2) the number of times during the period of time that the account was evaluated for service account behavior (the "non-service account attempt ratio");

in response to the service account attempt ratio exceeding a consistency threshold, classifying the account behavior as that of a service account;

in response to the non-service account attempt ratio exceeding the consistency threshold, classifying the account behavior as that of a non-service account;

in response to neither the service account attempt ratio and the non-service account attempt ratio exceeding the threshold, taking no action with respect to classifying the account behavior; and in response to the account during setup being classified as a non-service account but the account behavior being classified as that of a service account, issuing a security alert that a non-service account is behaving like a service account.

12. The non-transitory computer-readable medium of claim 11, wherein the service account behaviors further include: connecting to many hosts ("many hosts behavior") and having periodic activities ("periodic activity behavior"), and wherein whether an account is deemed to have any of these service account behaviors is determined relative to the threshold for the service account behavior.

13. The computer-readable medium of claim 12, wherein threshold for the many hosts behavior is calculated relative to a total number of hosts in the network.

14. The computer-readable medium of claim 12, wherein the threshold for the periodic behavior is a fixed value.

15. The computer-readable medium of claim 12, wherein determining whether an account triggers for the connected hosts behavior comprises:

calculating an average number of connected hosts per active day for the account;

determining whether the average number of connected hosts per active day exceeds a fixed threshold based on the number of hosts in the network; and in response to determining that the average number of connected hosts per active day exceeds the fixed threshold, concluding that the account triggers for the connected host behavior.

16. The computer-readable medium of claim 12, wherein determining whether an account triggers for the periodic behavior comprises:

dividing each day in a period of time into a plurality of fixed-length windows;

counting the number of events for the account in each fixed-length window to create an event-window sequence for each day during the period of time;

quantifying distances between the window sequences in sequential active days during the relevant period;

calculating an average inverse distance during the relevant period;

determining whether the average inverse distance exceeds a fixed threshold;

in response to determining that the average inverse distance exceeds a fixed threshold, concluding that the account triggered for the always online behavior.

17. The computer-readable medium of claim 12, wherein the service account behaviors also include being online all the time ("always online behavior").

18. The computer-readable medium of claim 17, wherein the threshold for the always online behavior is dynamically determined each time the behavior of the accounts in the network is classified, and wherein the threshold is determined by ranking accounts by a function of an average number of active fixed-length windows and identifying an acceleration point in the function values.

19. The computer-readable medium of claim 18, wherein determining whether an account triggers for always online behavior further comprises:
   dividing days in a period of time into fixed-length windows;
   for each account, tracking the number of active windows in the period of time;
   for each account, calculating an average number of active fixed-length windows;
   for each account, calculating a function of the average number of active fixed-length windows, wherein the function is the behavior indicator for always online behavior;
   ranking accounts in ascending order of function values;
   dividing ranked accounts into fixed-size windows each having a sequence number;
   computing the sum of the function values of each window ($S_i$), wherein i is the sequence number;
   starting with the first fixed-size window, identifying the first value for i in which $S_{i+2}/(S_i+S_{i+2})$ is greater than a minimum acceleration rate, wherein the minimum accelerate rate is a threshold with a predetermined value;
   setting the dynamic threshold for the always online behavior to the function value of the first account in the (i+1)th window for the above-identified value of i;
   for each account with a function value about the dynamic threshold, concluding that the account triggered for the always online behavior.

20. The computer-readable medium of claim 11, wherein:
   accounts in the network are evaluated for service account behavior on a daily basis;
   calculating the service account attempt ratio comprises calculating the number of days, over a period of x days, that an account triggered for service account behavior and dividing the number by x; and
   calculating the non-service account attempt ratio comprises calculating the number of days, over a period of x days, that an account did not trigger for service account behavior and dividing the number by x, wherein x is a number greater than 1.

21. A computer system for identifying and classifying service accounts in a network based on account behavior, the system comprising:
   one or more processors; and
   one or more memory units coupled to one or more processors, wherein the one or more memory units store instructions that, when executed by the one or more processors, cause the system to perform the operation of:
      classifying an account during setup as a service account or a non-service account;
      tracking networks events associated with the account;
      for each of a plurality of service account behaviors, calculating an indicator of the extent to which the account displays the service account behavior (a "behavior indicator"), wherein there is a different behavior indicator for each of the service account behaviors, wherein each behavior indicator is calculated based on the network events associated with the account, and wherein one service account behavior is generating many network events ("many events behavior");
      for each of the service account behaviors, determining whether the applicable behavior indicator satisfies a threshold specific to the service account behavior, wherein the threshold for the many events behavior is dynamically determined each time accounts in the network are classified, and wherein the threshold is determined by ranking accounts by the average number of events per active day and then identifying an acceleration point in the average number of events per active day;
      in response to the account having one or more behavior indicators satisfy the applicable threshold, determining that the account triggered for service account behavior, wherein determining whether an account triggers for many events behavior further comprises:
         for each account in the system, calculating the average number of events of any type per active day,
         ranking accounts in ascending order of average number of events per active day,
         dividing ranked accounts into fixed-size windows each having a sequence number,
         computing the sum of each window ($S_i$), wherein i is the sequence number,
         starting with the first fixed-size window, identifying the first value for i in which $S_{i+2}/(S_i+S_{i+2})$ is greater than a minimum acceleration rate, wherein the minimum acceleration rate is a threshold with a predetermined value,
         setting the dynamic threshold for the many events account behavior to the average number of events per active day in the first account in the (i+1)th window for the above-identified value of i, and
         for each account with an average number of events per active day above the dynamic threshold, concluding that the account triggered for the many events behavior;
      calculating a ratio of (1) the number of times the account triggered for service account behavior during a period of time to (2) the number of times during the period of time that the account was evaluated for service account behavior (the "service account attempt ratio");
      calculating a ratio of (1) the number of times the account did not trigger for service account behavior during the period of time to (2) the number of times during the period of time that the account was evaluated for service account behavior (the "non-service account attempt ratio");
      in response to the service account attempt ratio exceeding a consistency threshold, classifying the account behavior as that of a service account;
      in response to the non-service account attempt ratio exceeding the consistency threshold, classifying the account behavior as that of a non-service account;
      in response to neither the service account attempt ratio and the non-service account attempt ratio exceeding the threshold, taking no action with respect to classifying the account behavior; and
      in response to the account during setup being classified as a non-service account but the account behavior being classified as that of a service account, issuing a security alert that a non-service account is behaving like a service account.

22. The system of claim 21, wherein the service account behaviors further include: connecting to many hosts ("many hosts behavior") and having periodic activities ("periodic activity behavior"), and wherein whether an account is deemed to have any of these service account behaviors is determined relative to the threshold for the service account behavior.

23. The system of claim 22, wherein threshold for the many hosts behavior is calculated relative to a total number of hosts in the network.

24. The system of claim 22, wherein the threshold for the periodic behavior is a fixed value.

25. The system of claim 22, wherein determining whether an account triggers for the connected hosts behavior comprises:
   calculating an average number of connected hosts per active day for the account;
   determining whether the average number of connected hosts per active day exceeds a fixed threshold based on the number of hosts in the network; and
   in response to determining that the average number of connected hosts per active day exceeds the fixed threshold, concluding that the account triggers for the connected host behavior.

26. The system of claim 22, wherein determining whether an account triggers for the periodic behavior comprises:
   dividing each day in a period of time into a plurality of fixed-length windows;
   counting the number of events for the account in each fixed-length window to create an event-window sequence for each day during the period of time;
   quantifying distances between the window sequences in sequential active days during the relevant period;
   calculating an average inverse distance during the relevant period;
   determining whether the average inverse distance exceeds a fixed threshold;
   in response to determining that the average inverse distance exceeds a fixed threshold, concluding that the account triggered for the always online behavior.

27. The system of claim 22, wherein the service account behaviors also include being online all the time ("always online behavior").

28. The system of claim 27, wherein the threshold for the always online behavior is dynamically determined each time the behavior of the accounts in the network is classified, and wherein the threshold is determined by ranking accounts by a function of an average number of active fixed-length windows and identifying an acceleration point in the function values.

29. The system of claim 28, wherein determining whether an account triggers for always online behavior further comprises:
   dividing days in a period of time into fixed-length windows;
   for each account, tracking the number of active windows in the period of time;
   for each account, calculating an average number of active fixed-length windows;
   for each account, calculating a function of the average number of active fixed-length windows, wherein the function is the behavior indicator for always online behavior;
   ranking accounts in ascending order of function values;
   dividing ranked accounts into fixed-size windows each having a sequence number;
   computing the sum of the function values of each window ($S_{-i}$), wherein i is the sequence number;
   starting with the first fixed-size window, identifying the first value for i in which ($S_{i+2}/S_i+S_{i+2}$) is greater than a minimum acceleration rate, wherein the minimum accelerate rate is a threshold with a predetermined value;
   setting the dynamic threshold for the always online behavior to the function value of the first account in the (i+1)th window for the above-identified value of i;
   for each account with a function value about the dynamic threshold, concluding that the account triggered for the always online behavior.

30. The system of claim 21, wherein:
   accounts in the network are evaluated for service account behavior on a daily basis;
   calculating the service account attempt ratio comprises calculating the number of days, over a period of x days, that an account triggered for service account behavior and dividing the number by x; and
   calculating the non-service account attempt ratio comprises calculating the number of days, over a period of x days, that an account did not trigger for service account behavior and dividing the number by x, wherein x is a number greater than 1.

* * * * *